Aug. 13, 1968    R. B. DOWNEY    3,396,647
PHOTOGRAPHIC FILM ASSEMBLY
Filed Dec. 27, 1965    3 Sheets-Sheet 1

INVENTOR
Rogers B. Downey
BY
Brown and Mikulka
ATTORNEYS

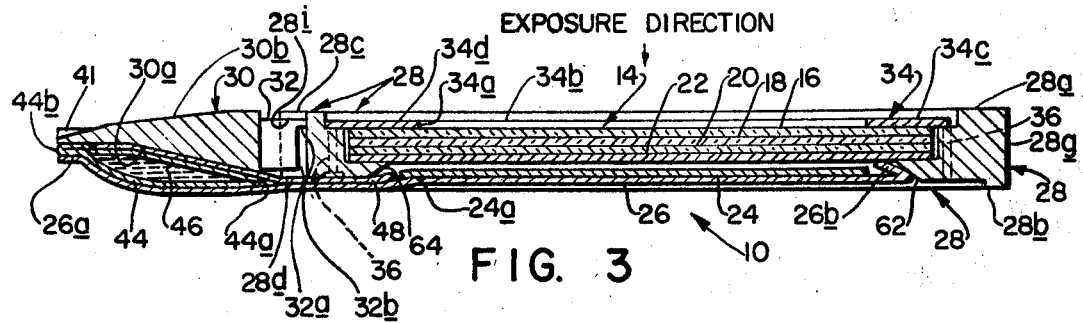
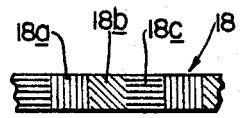
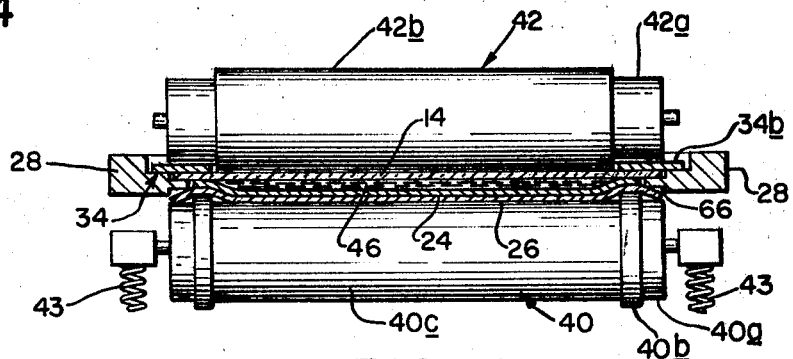
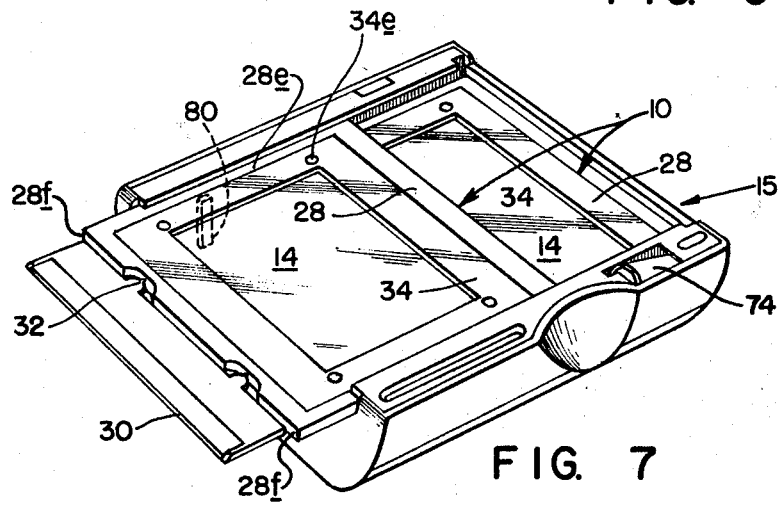

United States Patent Office 3,396,647
Patented Aug. 13, 1968

3,396,647
PHOTOGRAPHIC FILM ASSEMBLY
Rogers B. Downey, Lexington, Mass., assignor to Polaroid Corporation, Cambridge, Mass., a corporation of Delaware
Filed Dec. 27, 1965, Ser. No. 516,494
6 Claims. (Cl. 95—13)

ABSTRACT OF THE DISCLOSURE

A film unit of a self-developing type, either in black-and-white or color, for use in a miniature camera which includes compressive processing means, such as a pair of pressure rolls. The film unit is suitable for incorporation in a film pack. It is premounted and, following its exposure and processing in the camera, can be immediately viewed, either directly or by projection on a screen.

---

The film assembly of the present invention is of a self-developing type containing a releasable processing liquid. It is capable, when photographically exposed and treated by an applied compression, of producing in a matter of a few seconds a finished photographic transparency in either black-and-white or full color, depending upon its inherent characteristics, through a diffusion transfer process. Immediately thereafter it is ready for direct viewing or projection.

The film assembly is adapted to be carried in a magazine or container with a plurality of like units as a film pack, the magazine being mounted in a camera of a so-called 35 mm. or miniature category but possessing special features for cooperating with the film assembly to effect its exposure and processing. A camera embodying processing apparatus of a type suitable to such a purpose is described in my copending U.S. patent application, Ser. No. 516,416, filed Dec. 27, 1965, now Patent 3,369,470.

The film assembly comprises an essentially multilayer film component which includes a silver halide emulsion layer, a liquid-containing component and other elements contributive to image formation, to be described. The image is produced by the transfer of image-forming substances to a designated image-receiving surface.

Processing of a film assembly is initiated by moving it between compressive means and involves mechanical transport means operating according to a predetermined program. The compressive means is operative in part according to its structural characteristics and in part through response to contact with structural elements of the film assembly occurring in a programmed sequence.

A processing liquid releasably carried by the film assembly and suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming ingredient such as a synthetic polymer of the type of sodium carboxymethyl cellulose. Additionally, it may contain a mordant depending upon what, if any, dye-image-forming properties are included. In producing a black-and-white image to be viewed as such, or in conjunction with a color screen for obtaining a first or preferred type of full-color rendition, a latent image is developed; the exposed silver halide is reduced to silver, and the unreduced silver halide forms a soluble silver complex which is transferred from undeveloped areas to the image-receiving surface, the image being formed on the latter in silver and viewed in association with the color screen. In the production of a second type of color rendition, namely, one employing substances capable of forming dye images at the image-receiving surface, dyes, color couplers or the like, may be employed in the transfer process. Methods and materials for producing black-and-white or multicolored images of categories related to those contemplated herein are described in U.S. Patents Nos. 2,543,181, 2,614,926, 2,707,150, 2,726,154, 2,944,894, 2,983,606 and 3,087,815, with particular emphasis on the last-named patent. Because of the aforesaid alternative of employing either a black-and-white or an inherently colored image in the final print assembly, the choice being possible with some differences of color-providing components but a substantially similar mount and processing structure, particular emphasis is given herein to such physical characteristics as those which relate to definition of image area, release, distribution and imbibition of the processing liquid, and the stripping away of processing elements unessential to the final mounted print.

In accordance with the foregoing considerations, objects of the invention are to provide a novel film unit or assembly which is adapted, immediately following its photographic exposure, to conversion to the form of a completely mounted slide or transparency of high quality, visible in either black-and-white or color with particular emphasis on the latter; to provide a film assembly of the subject category which incorporates a color screen and which is adapted to produce a black-and-white image selectively aligned therewith for providing an image visible in full color; to provide a film assembly of the character described which is particularly adapted to use with, and which thus contributes to the structural advantages of an improved type of miniature camera; to provide a film assembly having structural elements which coact with structural components of a compressive mechanism of a camera for effecting programmed differential applications of compressive force; and to provide a film assembly, as stated, the structure of which contributes to a more efficient and rapid completion of the processing operation.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a diagrammatic side elevation view of the film assembly, in cross-section;

FIG. 4 is a fragmentary cross-sectional view of a portion of one layer of the film assembly of FIG. 3;

FIG. 7 is a diagrammatic perspective view of film assemblies of the invention and a magazine for mounting them in a camera;

FIG. 9 is a diagrammatic view, partly in cross-section, of a film assembly undergoing compression between the pressure rolls.

Figure 1:
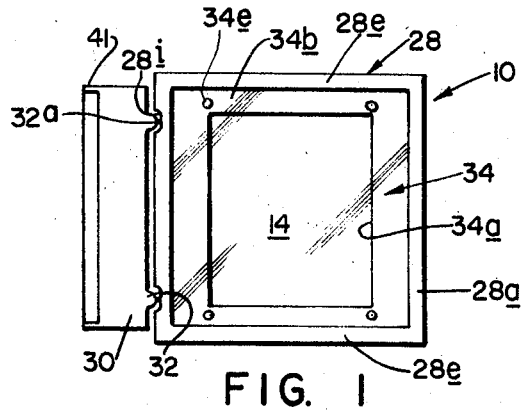
FIGURE 1 is a diagrammatic plan view of the front side of the film assembly.
Figure 2:
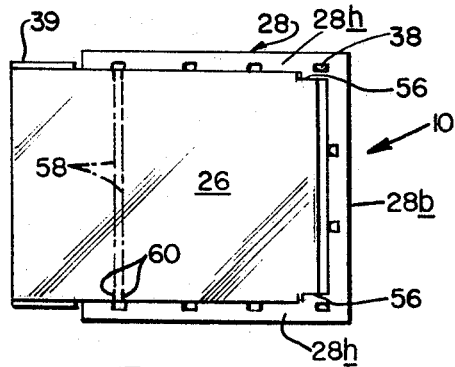
FIG. 2 is a diagrammatic plan view of the rear side of the film assembly.
Figure 10:
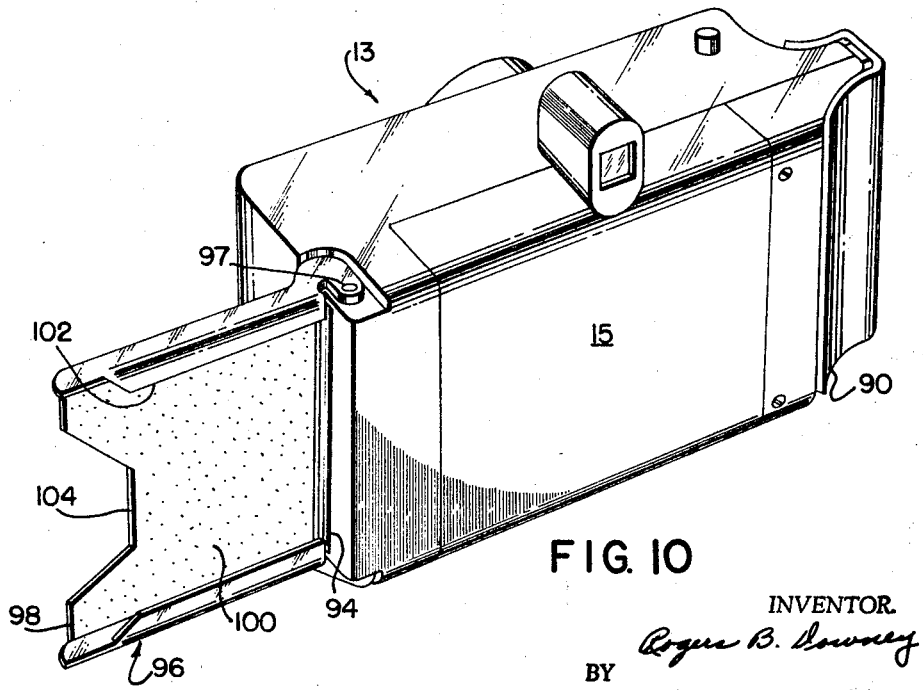

Referring now to FIGS. 1 and 2, the front side of a semi-mounted film assembly 10 of the invention is shown in FIG. 1, namely, that surface is illustrated which faces the exposure aperture 12 of a camera 13 (FIG. 11), the camera being adapted to perform both photographic exposure and processing of the film assembly. The rear surface of the film assembly is shown in FIG. 2. The term "semimounted" is employed in the sense that a slight modification of the film mount is performed, manually, prior to the film assembly's being ready for projection. The terms "front" and "rear" or "forwardly" and "rearwardly," as used herein, refer, respectively, to proximity to or remoteness from the front of the camera in which the film assembly is to be positioned. The assembly comprises a supported composite-image-providing component 14, which, in a preferred example and as shown in FIG. 3 may be regarded as including, from front-to-rear in at least the area of photographic exposure, a transparent base layer 16, a light-transmitting additive color-screen layer 18 composed, for example, of red, green and blue screen elements, 18a, 18b and 18c, respectively, arranged geometrically, as shown in FIG. 4, or in an irregular or intermixed mosaic, a transparent image-receiving layer 20, and a photosensitive silver halide emulsion layer 22, e.g., a panchromatic emulsion. Photographic exposure of the emulsion is performed through the base, color-screen and image-receiving layers. Superimposed therewith are a contacting opaque adhesion-control or stripping layer 24, substantially coextensive with the image-carrying area of the assembly, which is used in stripping away the emulsion from the image-receiving layer after completion of the processing operation, and an outer cover sheet 26. The latter is formed, for example, of a paper having an allover coating of a polyethylene adapted to heat-sealing. The layers 16, 18, 20 and 22 are preferably bonded together to provide an integral unit. Neither the stripping layer 24 nor the cover sheet 26 is bonded to the emulsion, at least within the confines of the image area. A plurality of film assemblies is carried by a magazine 15 which, in turn, is mounted on the camera, as shown in FIG. 10. The stripping layer 24 is bonded along its leading margin at 24a to the cover sheet 26 by a heat seal.

The color-screen layer 18 serves during the photographic exposure in a multifiltering capacity for exposing the photosensitive layer 22 selectively to differentially-colored portions of the photographic subject. Assuming the finally-produced image to be rendered by the diffusion transfer process in black-and-white, the color screen 18, with its components in selective alignment with associated image portions, serves as a color-providing medium resulting in an image which appears in full color, either when viewed directly or when projected. The stripping layer 24 may, for example, be composed of an opaque plastic sheet such as cellulose triacetate or a polyester, suitably treated to provide, in conjunction with the solidified processing liquid, a bond with the emulsion 22 which is stronger than that of the latter to the image-receiving layer 20. To enhance this condition, a so-called strip-coat may be provided between the layers 20 and 22, e.g., a transparent layer of carboxymethyl cellulose or cellulose acetate phthalate.

The elements of the film assembly making up the aforesaid image-providing component 14 and associated layers are carried by a substantially rigid mount component 28 composed of a suitably nondeformable material, for example, of a plastic such as a thermoplastic resin of the acetal family, an acrylic, or a polystyrene and including several mounting levels or planes for supporting sheet and film components of the assembly. The mount includes a tapered tab 30 projecting laterally generally in the plane thereof so as to be pointed in the direction that the film assembly is to be moved for processing purposes. The mount and tab are interconnected by a pair of frangible joining or link members 32, the complete unit being conveniently formed as a single molding. A framing element or mask 34 formed, for example, of a thin sheet of a metal such as aluminum or of a plastic such as, a polystyrene, a polyethylene or a suitable paper is fastened to the front face of the mount 28 by the rearwardly-extending rivet-like connecting members 36. The latter, in one preferred embodiment, consist of slender overturned extensions or projections of the metallic mask 34 which pass through the small bores 38 formed in the mount. The connecting members 36, when their extremities are crimped, serve to firmly attach the mask to the mount. Assuming that the mask is formed of a material other than a metal, separate rivet-like attaching elements may be employed or the mask may be bonded directly to the mount by a suitable adhesive. The aperture 34a of the mask outlines or defines the uncovered area of the photosensitive emulsion 22 which is subject to exposure and, accordingly, it determines the dimensions of the finished print. These dimensions may, advantageously, be somewhat larger than the mat-opening measurements of a conventional "35 mm." transparency. Moreover, the image area or mat-opening may be of a shape which is different from that illustrated. Thus, although it is indicated in the illustrations that a slightly "vertical" print is produced when the camera is positioned horizontally, the shape of the mask 34 and the exposable area of film component 14 controlled thereby can be altered to reverse the long and short dimensions illustrated or even to assume a square configuration. The tab 30, having the raised end-portions or flanges 39 and 41, acts in a wedging capacity when inserted between a pair of compressive means such as the rotatable pressure rolls 40 and 42 to force the rolls apart, at least one of the rolls having resilient mounting means 43 which permit their separation. When manually broken off, the tab also serves, in conjunction with the stripping layer 24, to effect the previously mentioned stripping of the emulsion 22 from the image-receiving layer 20. The raised end-portions 39 and 41 serve primarily as spacing means to maintain an even or level stacking of the film assemblies in the magazine 15. In a modification they may constitute guides relative to the pressure rolls, contributing to a correct linear entry of the film assembly therebetween. In a further modification it is contemplated that they may serve as bearing portions for direct contact with the pressure rolls to control the spacing therebetween.

Figure 8:
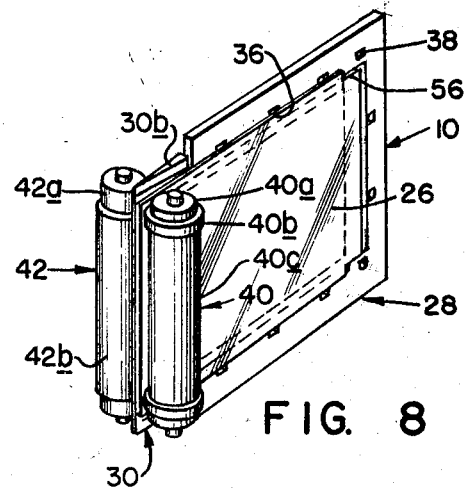
FIG. 8 is a diagrammatic perspective view of a film assembly entering a pair of pressure rolls.
Figure 6:
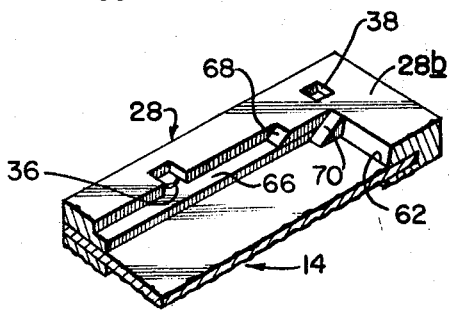
FIG. 6 is an enlarged diagrammatic perspective view of a fragment of the assembly of FIG. 5.
Figure 5:
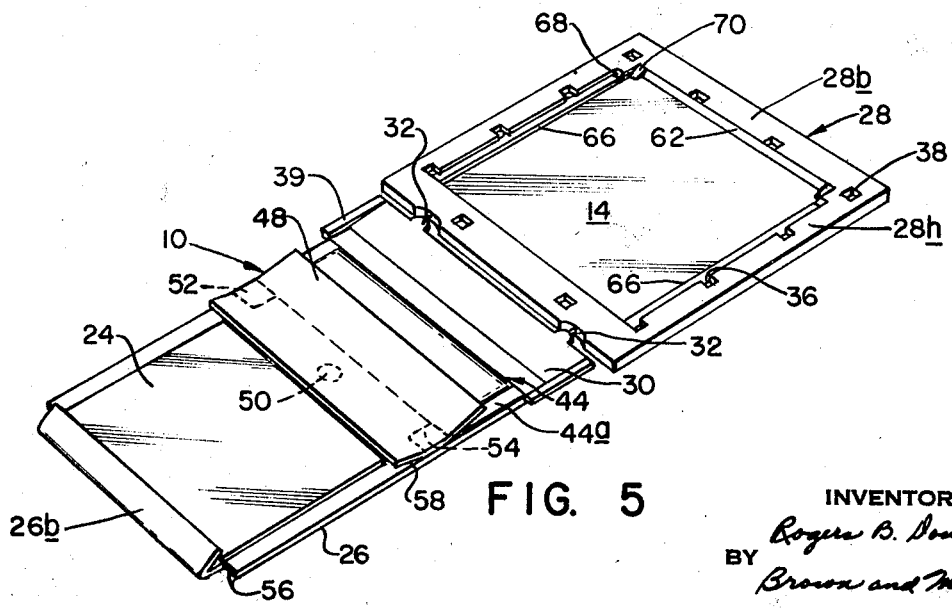
FIG. 5 is a diagrammatic perspective view of the rear side of the film assembly with a cover sheet and attached parts folded back to further illustrate the structure of the assembly.
Figure 11:
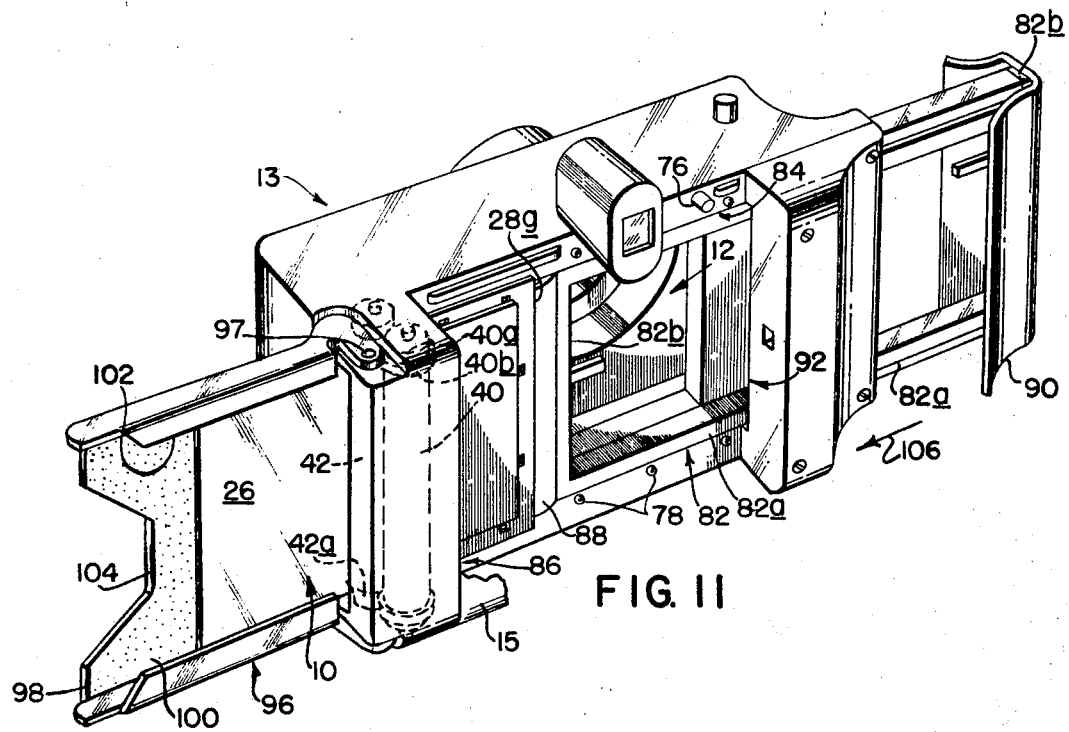
FIGS. 10 and 11 are diagrammatic perspective views of camera structure with film assemblies of the invention positioned therein.

Further referring to the film assembly 10, a container or pod 44, mounted within a recessed area 30a of the tab, releasably holds a sealed-in processing liquid 46. When the container is compressed, the processing liquid is predeterminedly released between its separably-sealed edges at 44a. This occurs when the film assembly, as viewed in FIGS. 3, 8 and 11, is advanced in a direction to the left between the pressure rolls. In this connection, the portions of the film assembly first approaching the pressure rolls are termed "leading," and relatively remotely-located portions are termed "trailing." A sheet-like apron or bib 48, in conjunction with the cover sheet 26, controls to a large degree the flow and spreading of the released processing liquid, the two cooperating to conduct the liquid directly to the area of emulsion 22.

The pressure roll 40 is of a length, relative to the spacing between the raised or flanged end-portions 39 of the tab, such that it is positioned between these end-portions during passage of the tab between the pressure rolls. At this stage, the spacing between the rolls, as determined, respectively, by the working surface 40c of the rear roll bearing against the rear surface or cover sheet 26 of the assembly, and by the working surface 42b of the front roll bearing against the front surface 30b of the tab 30, provides a compression of the container such that a separation or opening of the container-wall marginal edges at 44a and release of the processing liquid therebetween occurs.

The apron 48 may also suitably be composed of a polyethylene-coated paper. Its rear surface is heat-sealed at the small area or spot 50 to the cover sheet to facilitate a correct flow of the released processing liquid and a complete coverage of the picture area by presenting during the liquid spreading operation a small barrier at this central location thus providing temporarily-diverging streams of the liquid which flow transversely of the film assembly towards its longitudinal margins to effect a more complete coverage. These streams of liquid again merge prior to entrance of the liquid into the area of the exposed emulsion 22. The rear surface of the apron 48 is also heat-sealed to the cover sheet at the two small transverse edge areas 52 and 54 to provide a firm attachment of the apron to the cover sheet. The sac-like liquid container 44, comprising a suitable metal foil with a kraft paper covering and of a type generally similar to that described in U.S. Patent 2,543,181, is bonded along its leading front margin at 44b to the tab 30, as by a thin solvent-type coating of polystyrene. The cover sheet 26 is bonded by a heat seal to the container 44 along mutually-adjacent leading marginal portions of the two components at 26a.

The cover sheet 26 terminates in a folded-over portion 26b which serves to aid in preventing escape of any remaining surplus of the processing liquid from the trailing end of the film assembly at the conclusion of its progressive compression. The cover sheet 26 also includes a pair of cut-out areas 56 adjacent to the folded portion 26b which serve a purpose to be described below. Additionally, a pair of transverse parallel creases 58 and a plurality of short transverse slits 60 are provided in the cover sheet adjacent to the area at which the stripping sheet 24 is attached thereto. These provide a localized flexibilty of the cover sheet and a slightly offset relation of the portion thereof covering the image area which, together contribute to maintaining a parallel planar relation of the stripping sheet and the emulsion 22. They thus serve to prevent any tendency, which might otherwise exist, of the attached stripping sheet and interposed processing liquid to prematurely pull away from the emulsion during the processing operation.

The mount component 28 includes a pair of transversely-extending, angularly-disposed, inner marginal faces 62 and 64 and a pair of transversely-spaced, recessed, longitudinal channels or tracks 66. The beveled faces 62 and 64 are disposed at acute angles relative to the planes of the film component 14 and the mount 28. The channels 66 are parallel to these planes. A first pair of ramps 68 leads outwardly and rearwardly from the channels 66 to a rear planar surface 28b of the mount. A second pair of ramps 70 leads outwardly and rearwardly from the plane of the film component 14 to the surface 28b of the mount. The ramps are thus disposed at acute angles relative to the surface 28b. The leading beveled face 64, which may also be termed a ramp inasmuch as it guides the rear pressure roll 40 forwardly toward the emulsion 22, and ramps 68 and 70 serve the purpose of varying the spacing of the pressure rolls 40 and 42 at given stages during passage of the film assembly therebetween, to be described below. The aforesaid cut-out areas 56 of the cover sheet permit the folded-over portion 26b of the cover sheet to fit snugly within the mount opening.

As previously intimated, processing of each film assembly is achieved by subjecting it to progressive compression between the pressure rolls 40 and 42. The front pressure roll 42 includes a peripheral groove 42a adjacent to each of its extremities. The grooves 42a bear against longitudinal portions 34b of the mask 34 during advancement of the picture area of the film assembly between the rolls during spreading of the processing liquid. The rear pressure roll 40 includes a peripheral groove 40a and a peripheral flange 40b adjacent to each of its extremities. The flange 40b assumes the compressive load during the liquid spreading operation and both the groove 40a and flange 40b function with respect to the ramps 64, 68 and 70 for effecting the aforesaid variation of spacing of the pressure rolls.

When the aperture of the mount 28 lying within the longitudinal and transverse framing members thereof enters the "bite" of the pressure rolls, the peripheral grooves 40a of the rear roll are positioned generally within the longitudinal channels 66 of the mount, but do not actually bear against the channels. This is due to the presence of the intervening longitudinal marginal portions, respectively, of the cover sheet 26, stripping sheet 24, film component 14 and mask 34, by reason of which the load is applied where the peripheral flanges 40b and the peripheral grooves 42a bear against opposite sides of the film assembly. A gap or spacing is thus established between the working or functional surfaces 40c and 42b of the pressure rolls which is predetermined with respect to factors relating to the viscosity of the processing liquid, etc., to obtain the most efficient spreading of the liquid.

After the area of the film component 14 lying within the opening determined by the mask 34 has passed between the pressure rolls and spreading of the processing liquid has been completed, it is required to additionally space the rolls 40 and 42 apart to prevent any further spreading action, or, otherwise stated, to trap any excess of the processing liquid. Thus, before the marginal, surface portions 28a and 28b of the trailing transverse frame member of the mount, namely, the front and rear surfaces thereof, enter the "bite" of the pressure rolls, the peripheral grooves 40a of the rear pressure roll ride relatively rearwardly along the first pair of ramps 68. Immediately thereafter, the flanges 40b are caused to ride relatively rearwardly along the second pair of ramps 70 to the surface 28a. Accordingly, the rolls are increasingly spaced apart and their compressive action is relieved. During their passage along the ramps, the rear roll components 40a and 40b contact intervening portions of cover sheet 26 to bar escape of the liquid. Coincidentally, the working surface 42b of the front pressure roll is in contact with the transverse surface 34c of the mask and the transverse surface portion 28a of the mount. With the aforesaid increase of spacing between the pressure rolls, any remaining excess of the processing liquid is substantially relieved of the compressive force and is effectively "trapped," so that no escape thereof which might result in a possible fouling of the mechanish, can occur. The ramp 68 is inclined at a steeper angle than that of the ramp 70, the purpose being to commence the liquid trapping operation rapidly, followed by a more gradual increase in the spacing of the rolls as the presence of liquid diminishes.

During the foregoing operation of spreading the processing liquid across the image area, as shown in FIG. 9, the working surface 42b of the front pressure roll is in contact with the support or base layer of the film component 16. The principal purpose of the wedge-like tab 30, as previously described, is to permit the rolls to be forced apart easily to permit introduction of the major portion of the film assembly therebetween and to facilitate compression and release of the processing liquid. Due to the tapered structure of the tab 30, the pressure rolls are progressively forced apart and are at substantially maximum relative spacing when the leading transverse surfaces 28c and 28d of the mount and the leading transverse surface 34d of the mask are introduced to the pressure rolls. The gap between the rolls progressively lessens as the angled marginal face or ramp 64 of the film-assembly mount is brought between them, rear roll 40 thus being permitted a relatively forward movement and a proper spacing for spreading the released processing liquid thereby being established.

The film-assembly container or magazine 15 is suitably composed of a metal or a plastic material. When installed, the magazine effectively forms a part of the camera housing and may be of either a permanent or a disposable type. When mounted on the camera, its frontal portions, in conjuction with adjoining portions of the latter, provide a narrow light-tight chamber within which are performed the photographic exposure and processing of each film assembly, in succession. The front face of the magazine is substantially open. Assuming the magazine to be of a disposable type, the gauge of the material thereof may be lighter than that of the camera housing and it may even be composed of a different and less expensive material, primarily to reduce its cost. A lever mechanism, underlying the film assemblies 10 and biasing them forwardly in the magazine, includes an actuating lever indicated at 74. The element 74 is responsive to a spring-loaded, rearwardly-projecting stud 76 of the camera. Contact of the stud 76 with the lever 74 is established when the magazine is mounted on the camera, as shown in FIG. 10.

Assuming the magazine to be mounted on the camera, the longitudinal marginal portions 28e of the film assembly are then brought into slidable engagement with a plurality of spacer elements 78 projecting rearwardly from the inner rear face of the camera. Each film assembly, when brought to a foremost relationship in the magazine, is thus successively positioned precisely at the focal plane, at the exposure aperture 12, and is in readiness to be slidably transported therefrom toward the pressure rolls for processing. That film assembly of the film pack, underlying and in contact with the foremost film assembly, is held against inadvertent sideways movement during removal of the latter by contact of leading transversely-extreme edge-portions 28f of its mount component with a pair of flanges 80 extending slightly inwardly from the side-walls of the magazine and disposed in a rear-to-front direction. The flanges 80 extend only so far forwardly in the magazine as to permit unobstructed sideways movement of the foremost film assembly. It is to be understood that an opaque, light-obstructing sheet, not shown, removable by means to be described for transporting the film assemblies, is positioned in front of the foremost film assembly prior to the first exposure. An opaque foil may be employed to enclose the loaded magazine as initially provided, the covering being removed prior to or during mounting of the magazine on the camera. FIG. 7 illustrates a film assembly undergoing slidable removal from the magazine. It will be noted that the lever 74 is partially depressed, a condition indicating that some of the film assemblies of the film pack have already been removed from the magazine.

Elements of an apparatus for processing film assemblies of the present invention, additional to the pressure rolls 40 and 42, previously described, include a rectangular frame-like film-assembly-transporting or propulsive element 82. The latter comprises, essentially, two longitudinal L-shaped bars 82a and two transverse flat connecting bars 82b. The longitudinal bars 82a are mounted for slidable linear movement at 90° to the axes of the pressure rolls in a pair of channels or tracks 84 formed in the camera housing and extending parallel to the long or horizontal dimension thereof. The channels extend through the camera housing at one end and terminate at the other end in an opening at 86 leading to the pressure rolls 40 and 42. The propulsive element 82 is, appropriately, molded in one piece of a suitable, substantially rigid, preferably low-friction plastic such as an acetal, or the like. It also includes a cross-piece or tongue 88 located, in terms of functional movement, at the leading end thereof and extending angularly rearwardly from the leading transverse bar 82b. When the propulsive element 82 is moved toward the pressure rolls, the slightly flattened extremity of the tongue is intended to bear or push against the trailing edge 28g of each film-assembly mount and actuate its movement from the focal plane to and between the pressure rolls.

A handle 90 is attached to the trailing cross-bar 82b interconnecting the ends of the bars 82a which extend outwardly through apertures formed in the camera housing. Functional movement of the propulsive element 82 is obtained through manual operation of the handle. When it is pulled out to its fullest extent, as determined by engagement of the leading cross-bar 82b with limit stop means, not shown, the leading edge of the tongue or pusher 88 is in contact with the trailing edge of the foremost film assembly in the magazine which is positioned at the focal plane, as permitted by the widened aperture at 92 which allows entrance of the tongue 88 thereinto.

Assuming that the film assembly has undergone a photographic exposure and is to be processed, the handle 90 is then thrust inwardly, in an even movement. The film assembly is moved toward the pressure rolls 40 and 42, the front marginal surface portions 28e of the mount being in slidable contact with the spacer elements 78 of the camera and its rear marginal mount portions 28h being in slidable contact with the front marginal portions of a succeeding film assembly, under the slight compressive force exerted by the lever 74 of biasing means of the magazine. The tapered tab 30 and liquid container 44, bonded thereto, are almost immediately forced between the pressure rolls, compressing the liquid and separating the container closure at 44a. Release and spreading of the processing liquid 46 immediately follow during continued pushing of the film assembly between the pressure rolls, as determined by the mutually cooperating structure of rolls and film assembly, hereinbefore described. As previously stated, when spreading of the processing liquid across the emulsion layer 22 of the film component 14 has been completed, the rolls are separated to a predetermined degree to trap any remaining excess of the processing liquid through ascension of the ramps 68 and 70 by groove and flange components of the roll 40.

A preferred structure of the processing apparatus is that which assumes that the pusher element 88 is held against further movement just short of the "bite" of the pressure rolls 40 and 42 by any suitable limit stop means as, for example, by contact of the handle 90 with the camera housing. In this instance, the trailing marginal portion of the film assembly mount, namely, the surfaces 28a and 28b, would still be held under compression by the pressure rolls while the major forward portions of the film assembly would extend beyond the rolls and exteriorly of the camera through a shielded exit slot 94. Because the front of the film component 14, as described, is supplied uncovered to permit its photographic exposure, actinic light which would be incident thereon, outside of the camera, after passage between the pressure rolls and prior to completion of the diffusion transfer process, which in the instance of a black-and-white image may require approximately 10 seconds, would, of course, ruin the print.

In view of the foregoing circumstances, it must be assumed that the film assembly, after passing beyond the pressure rolls is protected against any possibility of becoming "light struck" until its processing is completed, it being understood that the rear surface of the assembly is thus protected by the opaque stripping sheet element 24 but that the front surface is uncovered and would allow the penetration of light to the photosensitive area. One preferred means for the purpose constitutes a pivotal partial enclosure or semichamber 96 for receiving each film assembly immediately following its compression which can be folded rearwardly against the camera housing when not in use. The chamber, formed of a metallic substance or a rigid plastic and pivotally attached to the camera housing at 97, includes an opaque front wall composed, for example, of a plate-like member 98 lined with a piled fabric 100. A pair of rearwardly overturned side wall flange or channel members 102, integral with the plate 98, is adapted to slidably engage longitudinal marginal portions 28h of the film assembly mount and to provide a firm light-tight engagement of the front surface of each film assembly with the fabric 100. The chamber 96, by reason of its open rear face and a cut-out section 104 of the front wall and fabric, incorporates access means whereby, after the film assembly has been deposited in the chamber with the trailing surfaces 28a and 28b of the mount still remaining between, and held by the pressure rolls, it can be completely removed, manually, upon completion of the diffusion transfer processing operation. Other possible receiving chamber means might include, for example, a receptacle within the camera housing, per se, and other types of pivotal or otherwise attachable structures.

FIG. 10 illustrates the camera 13 with the loaded magazine 15 mounted thereon and with the pivotal semichamber 96 positioned for receiving a film assembly after its exposure and passage between the pressure rolls. FIG. 11 assumes that the magazine 15, largely broken away, is mounted on the camera. It illustrates movement of a film assembly 10 between the pressure rolls and partially into the pivotal semichamber 96 in response to manual actuation of the handle 90 in the direction of the arrow 104.

After completing processing of each film assembly and assuming its location outside of the camera, it can be immediately brought to a finally mounted state for direct viewing or projection. This is accomplished by first separating the tab 30 from the mount 28, the brittle, frangible, connecting pieces 32 being easily broken away for the purpose. This step may be performed most conveniently while the film assembly is still mounted in the chamber 96. Holding the tab 30, cover sheet 26 and exhausted liquid container 44, between the thumb and forefinger, as permitted by the cut-away portion 106 of the chamber, the apron 48, cover sheet 26, adhesion control sheet 24 and emulsion 22 are stripped, as a unit, from the image-receiving layer 20. Upon bending the tab 30, a narrow groove 32a, formed between the link 32 and mount 28, produces a fulcrum point at the small connecting neck 32b. A tensional force is thus exerted at 32b to provide a clean break within the recessed portion 28i of the mount. Accordingly, no sharp or ragged edge is permitted to project beyond the linear edge of the mount after the break. The mount 28 and remaining portions of the film component 14, including the base 16, color screen 18 and image-receiving sheet, bearing the image, are held firmly by the flanges 102, the latter facilitating the stripping operation. The image-receiving layer bears the black-and-white image correctly aligned with the color screen. After coating the then-externally-located image-receiving layer with a stabilizing and protective substance, as may be necessary, the mounted transparency is ready for direct viewing or projection.

Just prior to, or coincidental with, entrance of the leading edge of the picture area, as defined by the mask, between the pressure rolls it is desirable to provide the load at the grooves 42a of the front roll, as shown in FIG. 9, rather than at the central portion 42b to insure that the processing liquid will cover the emulsion adequately in the area aligned with the leading edge of the mask. This condition is equally desirable coincidental with or immediately following passage of the trailing edge of the picture area between the rolls. Accordingly, a small forwardly-extending protuberance 34e is formed in the mask at each of the four corners of the latter. The grooved portions 42a of the front roll bear upon these protuberances to insure that the processing liquid is spread in advance of, and beyond, those areas of the emulsion underlying the leading and trailing edges of the mask.

It may be desirable to shorten the length of tab 30, transversely of the assembly, from that shown to permit transverse sealed margins 44a of the processing-liquid container 44 to avoid compression by the pressure rolls and a possible undesirable exudation of the sealant used in bonding these margins. By thus shortening the tab, the transverse marginal portions of the liquid container overhang the edges of the tab and are not subject to compression, the load being entirely assumed by the central portions 42b and 42c of the rolls for fracturing the container and releasing the liquid. In this modification the end flanges 39 and 41 of the tab may be dispensed with.

It will be apparent that while the recited structure is a preferred one, some modification of the attachment of the components of the film assembly is possible. Thus, for example, the flow-control element 48 could be attached to the rear surface of tab 30, or the container 44 shortened, longitudinally, and the leading end of the cover sheet 26 bonded directly to the rear surface of the tab.

Since certain changes may be made in the above product without departing from the scope of the invention herein involved, it is intended that all matter contained in the above description or shown in the accompanying drawings shall be interpreted as illustrative and not in a limiting sense.

I claim:

1. A semimounted photographic film assembly adapted to be processed in a camera which includes compressive processing means cooperating therewith for providing, through a diffusion transfer method, a fully-mounted photographic transparency immediately following its removal from said camera, said film assembly being adapted to lateral movement between said compressive means and comprising a substantially rigid, rectangular mount composed of a substantially rigid plastic material and consisting of differentially-planar transverse and longitudinal frame portions surrounding a central rectangular aperture with a tapered tab having a concavity at one side projecting sideways from and frangibly attached to an outside leading edge of a frame portion of said mount so as to extend generally in the plane thereof, a composite film component comprising a photosensitive emulsion and a transparent image-receiving layer mounted at a given plane within a first of said frame portions, a rectangular frame-like mask composed of a thin metallic sheet material and mounted within and attached to a second of said frame portions at a second plane located, in terms of the direction of transmission of the incident light of a photographic exposure, forwardly of said given plane and overlapping outer marginal areas of said film component, said mask including a plurality of integral prongs normal to the plane thereof and inserted in a like plurality of bores formed in said mount and frictionally engaging the latter, a sac-like container releasably holding a photographic processing liquid positioned within said concavity of, and attached, in terms of said lateral movement, at its leading frontal surface to the leading transversely-disposed marginal portion of said tab, a flexible cover sheet attached to the leading transversely-extending marginal portion of said liquid container for reducing actinic light and facilitating the spreading of said processing liquid when released, said cover sheet having a forwardly overturned trailing extremity and being of a length and width adapted to substantially cover, respectively, said tab, a leading transverse frame portion and the rear surface of said film component, an apron-like processing-liquid flow-control sheet partially overlapping the front surfaces of said liquid container and cover sheet and attached at central and transversely-disposed marginal portions to the latter for controlling the flow of said processing liquid when released from said container, and an adhesion-control sheet attached at its leading transversely-disposed marginal area to said cover sheet adjacent to the trailing edge of said flow-control sheet and being substantially coextensive with said film component, said adhesion-control sheet forming, in conjunction with said released processing liquid, a bond to said emulsion which is stronger than that between said emulsion and said image-receiving layer, said tab, exhausted container, flow-control sheet, adhesion-control sheet, cover sheet and emulsion being adapted to be stripped away from said image-receiving layer to provide said mounted photographic transparency.

2. A semimounted photographic film assembly adapted to be processed in a camera which includes compressive processing means cooperating therewith for providing, through a diffusion transfer method, a fully-mounted photographic transparency immediately following its removal from said camera, said film assembly being adapted to lateral movement between said compressive means and comprising a substantially rigid, rectangular mount consisting of differentially-planar transverse and longitudinal frame portions surrounding a central rectangular aperture with a tapered tab having a concavity at one side projecting sideways from and frangibly attached to an outside leading edge of a frame portion of said mount so as to extend generally in the plane thereof, a composite film component comprising a photosensitive emulsion and a transparent image-receiving layer mounted at a given plane within a first of said frame portions, a rectangular frame-like mask mouted within and attached to a second of said frame portions at a second plane located, in terms of the direction of transmission of the incident light of a photographic exposure, forwardly of said given plane and overlapping outer marginal areas of said film component, a sac-like container releasably holding a photographic processing liquid positioned within said concavity of, and attached, in terms of said lateral movement, at its leading frontal surface to the leading transversely-disposed marginal portion of said tab, a flexible cover sheet attached to the leading transversely-extending marginal portion of said liquid container for reducing actinic light and facilitating the spreading of said processing liquid when released, said cover sheet having a forwardly overturned trailing extremity and being of a length and width adapted to substantially cover, respectively, said tab, a leading transverse frame portion and the rear surface of said film component, an apron-like processing-liquid flow-control sheet partially overlapping the front surfaces of said liquid container and cover sheet and attached at central and transversely-disposed marginal portions to the latter for controlling the flow of said processing liquid when released from said container, and an adhesion-control sheet attached at its leading transversely-disposed marginal area to said cover sheet adjacent to the trailing edge of said flow-control sheet and being substantially coextensive with said film component, said adhesion-control sheet forming, in conjunction with said released processing liquid, a bond to said emulsion which is stronger than that between said emulsion and said image-receiving layer, said cover sheet also including a transversely-extending multi-fold and a pair of relatively short transverse slits adjacent to the area of attachment of said adhesion control sheet thereto to render the latter more flexible and facilitate its contact with said emulsion, said tab, exhausted container, flow-control sheet, adhesion-control sheet, cover sheet and emulsion being adapted to be stripped away from said image-receiving layer to provide said mounted photographic transparency.

3. A semimounted photographic film assembly adapted to be processed in a camera which includes compressive processing means cooperating therewith for providing, through a diffusion transfer method, a fully-mounted photographic transparency immediately following its removal from said camera, said film assembly being adapted to lateral movement between said compressive means and comprising a substantially rigid, rectangular mount consisting of differentially-planar transverse and longitudinal frame portions surrounding a central rectangular aperture with a tapered tab having a concavity at one side projecting sideways from and frangibly attached to an outside leading edge of a frame portion so as to extend generally in the plane thereof, a composite film component comprising a photosensitive emulsion and a transparent image-receiving layer mounted at a given plane within a first of said frame portions, a rectangular frame-like mask mounted within and attached to a second of said frame portions at a second plane located, in terms of the direction of transmission of the incident light of a photographic exposure, forwardly of said given plane and overlapping outer marginal areas of said film component, a sac-like container re-
leasably holding a photographic processing liquid positioned within said concavity of, and attached, in terms of said lateral movement, at its leading frontal surface to the leading transversely-disposed marginal portion of said tab, a flexible cover sheet attached to the leading transversely-extending marginal portion of said liquid container for reducing actinic light and facilitating the spreading of said processing liquid when released, said cover sheet having a forwardly overturned trailing extremity and being of a length and width adapted to substantially cover, respectively, said tab, a leading transverse frame portion and the rear surface of said film component, an apron-like processing-liquid flow-control sheet partially overlapping the front surfaces of said liquid container and cover sheet and attached at central and transversely-disposed marginal portions to the latter for controlling the flow of said processing liquid when released from said container, and an adhesion-control sheet attached at its leading transversely-disposed marginal area to said cover sheet adjacent to the trailing edge of said flow-control sheet and being substantially coextensive with said film component, a slight gap being provided between the trailing edge of said flow-control sheet and the leading edge of said adhesion-control sheet and said flow-control sheet being folded slightly forwardly at its trailing edge to facilitate a flow of said released processing liquid from, respectively, the rear surface of said flow control sheet, through said gap, to the front surface of said adhesion-control sheet, said adhesion-control sheet forming, in conjunction with said released processing liquid, a bond to said emulsion which is stronger than that between said emulsion and said image-receiving layer, said tab, exhausted container, flow-control sheet, adhesion-control sheet, cover sheet and emulsion being adapted to be stripped away from said image-receiving layer to provide said mounted photographic transparency.

4. A semimounted photographic film assembly adapted to be processed in a camera which includes a pair of pressure rolls cooperating therewith to comprise a liquid container and release a processing liquid for providing, through a diffusion transfer method, a fully-mounted photographic transparency immediately following its removal from said camera, at least one of said pressure rolls being resiliently mounted, said film assembly being adapted to lateral advancement between said pressure rolls and comprising a substantially rigid, rectangular mount consisting of differentially-planar transverse and longitudinal frame portions surrounding a central rectangular aperture with a tapered tab having a concavity at one side projecting sideways from and frangibly attached to an outside leading edge of a frame portion of said mount so as to extend generally in the plane thereof, said mount also including a plurality of ramp means integral with and leading forwardly and rearwardly from said differentially-planar surface portions of the mount for bearing the passage of the rear one of said pressure rolls thereacross to vary the spacing between said pressure rolls to a given degree and at predetermined stages of advancement of said film assembly therebetween, a unitary composite film component comprising a photosensitive emulsion and a transparent image-receiving layer mounted at a given plane within a first of said frame portions, a rectangular frame-like mask mounted within and attached to a second of said frame portions at a second plane located, in terms of transmission of the incident light of a photographic exposure, forwardly of said given plane and overlapping outer marginal areas of said film component, a sac-like container releasably holding a photographic processing liquid positioned within said concavity of, and attached, in terms of said lateral movement, at its leading frontal surface to the leading transversely-extending marginal portion of said tab, a flexible cover sheet attached to the leading transversely-disposed marginal portion of said liquid container for reducing actinic light and facilitating the spreading of said processing liquid when released, said cover sheet having a forwardly overturned trailing extremity and being of a length and width adapted to substantially cover, respectively, said tab, a leading transversely-extending frame portion and the rear surface of said film component, an apron-like processing-liquid flow-control sheet partially overlapping the front surfaces of said liquid container and cover sheet and attached at central and transversely-spaced marginal portions to the latter for controlling the flow of said processing liquid when released from said container, and an adhesion-control sheet attached at its leading transversely-disposed marginal area to said cover sheet adjacent to the trailing edge of said flow-control sheet and being substantially coextensive with said film component, said adhesion-control sheet forming, in conjunction with said released processing liquid, a bond to said emulsion which is stronger than that between said emulsion and said image-receiving layer, said tab, exhausted container, flow-control sheet, adhesion-control sheet, cover sheet and emulsion being adapted to be stripped away from said image-receiving layer to provide said mounted photographic transparency.

5. A photographic film assembly, as defined in claim 4, wherein said cover sheet includes cut-out portions adjacent to its trailing edge for permitting said forwardly overturned extremity of said cover sheet to be positioned within the recess formed by said frame portions of the mount.

6. A semimounted photographic film assembly adapted to be processed in a camera which includes compressive processing means cooperating therewith for providing, through a diffusion transfer method, a fully-mounted photographic transparency immediately following its removal from said camera, said film assembly being adapted to lateral movement between said compressive means and comprising a substantially rigid, rectangular mount consisting of differentially-planar transverse and longitudinal frame portions surrounding a central rectangular aperture with a tapered tab having a concavity at one side projecting sideways from and frangibly attached to an outside leading edge of a frame portion of said mount so as to extend generally in the plane thereof, a composite film component comprising a photosensitive emulsion and a transparent image-receiving layer mounted at a given plane within a first of said frame portions, a rectangular frame-like mask mounted within and attached to a second of said frame portions at a second plane located, in terms of the direction of transmission of the incident light of a photographic exposure, forwardly of said given plane and overlapping outer marginal areas of said film component, a sac-like container releasably holding a photographic processing liquid positioned within said concavity of said tab, a cover sheet attached to said liquid container for reducing actinic light and facilitating the spreading of said processing liquid when released, said cover sheet being of a length and width adapted to substantially cover, respectively, said tab, a leading transverse frame portion and the rear surface of said film component, an apron-like processing-liquid flow-control sheet partially overlapping the front surfaces of said liquid container and cover sheet and attached to at least the latter for controlling the flow of said processing liquid when released from said container, and an adhesion-control sheet attached to said cover sheet and being substantially coextensive with said film component, said adhesion-control sheet forming, in conjunction with said released processing liquid, a bond to said emulsion which is stronger than that between said emulsion and said image-receiving layer, said mount also including a plurality of ramp means leading forwardly and rearwardly from said differentially-planar surface portions of the mount for bearing the rear one of said compressive processing means thereacross to vary the spacing between said compressive processing means to a given degree and at predetermined stages of advancement of said film assembly therebetween, said ramp means leading rearwardly serving to facilitate the trapping of an excess of said processing liquid, said tab, exhausted container, flow-control sheet, adhesion-control sheet, cover sheet and emulsion being adapted to be stripped away from said image-receiving layer to provide said mounted photographic transparency, at least one of said container, flow-control sheet and cover sheet being attached to the rear surface of said tab.

References Cited
UNITED STATES PATENTS

| Re. 25,167 | 5/1962 | Booth | 95—39 XR |
| 2,543,181 | 2/1951 | Land | 95—13 XR |
| 2,972,532 | 2/1961 | Land | 95—13 XR |
| 3,309,201 | 3/1967 | Friedman | 95—13 XR |

NORTON ANSHER, *Primary Examiner.*

G. M. HOFFMAN, *Assistant Examiner.*